P. FROST.
Scythe Fastening.
Reissued Feb. 9, 1858.
No. 524.
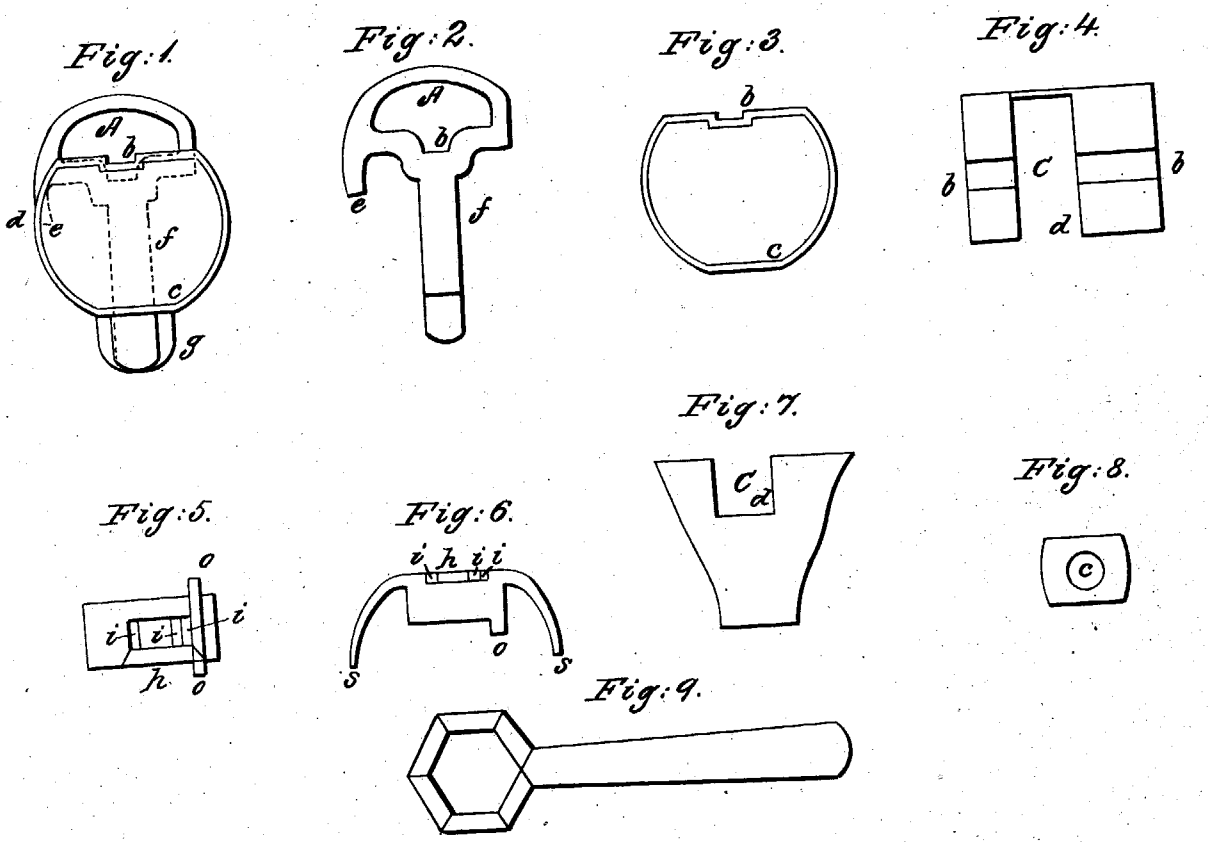
N. PETERS, Photo-Lithographer, Washington, D. C.

UNITED STATES PATENT OFFICE.

PINCKNEY FROST, OF SPRINGFIELD, VERMONT.

IMPROVEMENT IN SCYTHE-FASTENINGS.

Specification forming part of Letters Patent No. 9,531, dated January 11, 1853; Reissue No. 524, dated February 9, 1858.

*To all whom it may concern:*

Be it known that I, PINCKNEY FROST, of Springfield, in the county of Windsor and State of Vermont, have invented a new and Improved Mode of Fastening Scythes to the Snath; and I do hereby declare that the following is a full and exact description thereof.

The accompanying drawings represent views of my improved scythe-fastener.

The same letters refer to like parts.

Figure 1 represents the loop-bolt as used in connection with the set-ring. Fig. 2 is a side view of the loop-bolt, the thickness of which can be seen in the openings in Figs. 4 and 7 at C. Fig. 3 is an end view of the set-ring. Fig. 4 is a view of the set-ring as seen on the spotting. Fig. 7 is a view of one side of the set-ring. Fig. 8 is a view of the set-ring on the side opposite the spotting.

A in Figs. 1 and 2 is an opening for the admission of the shank or arm of the scythe.

*b* represents the grooves for the passage of the claw of the scythe.

C in Figs. 4 and 7 represents the opening in the set-ring for the admission of the loop-bolt, Fig. 2.

*d* represents the opening in the set-ring for the admission of the hook or lip E.

*f* represents the bolt which passes vertically through the snath and set-ring at *e*.

*g* represents the nut on the end of the bolt *f*, turned by the wrench represented in Fig. 9, by means of which the loop is drawn down upon the shank or arm of the scythe, fastening it firmly to the spotting.

Fig. 5 is a view of the face of the socket. Fig. 6 is a side view of the socket.

*h* represents the depression on the side of the claw-hole in which the extremity of the shank or arm of the scythe rests.

*i* represents the slides which are used for the purpose of varying the point of the scythe by setting it outward or inward with respect to the snath.

O O O represent projections on the sides of the socket for the purpose of gaining the greater strength of the wood in attaching it to the snath.

S represents straps which pass partially around the snath and are confined by screws or a rivet to the wood.

The peculiar construction of the loop-bolt and set-ring, as above described, constituting my improved scythe-fastener, adapts it to different sizes of scythe-shanks, and the advantages gained by the use of the grooves are, first, to permit the arm and claw of the scythe to pass through the loop without requiring the latter to be made so large as to be inconvenient and unnecessarily heavy; second, this form of the construction of the loop-bolt and set-ring lessens the labor in fastening the scythe to and unfastening it from the snath, it being unnecessary to turn the nut as far as otherwise would be required; third, the draft of the screw being directly toward the spotting of the snath the scythe will be more firmly held than if it were sidewise or lengthwise; but the precise form of the construction of the loop-bolt and set-ring above described, and represented in the drawings, I do not regard as essentially necessary to carry out practically the principle of my invention. The form of both the bolt and the ring may be varied, and yet the advantages secured by the peculiar form of construction above described may be retained.

The important and essential principle of my invention is the use of the loop-bolt and the set-ring, constructed substantially in the manner above set forth, in combination with each other. The bolt, being operated by the screw and nut or their equivalents, draws the shank of the scythe down to and confines it firmly upon the snath. The ring gives the necessary strength to the snath, and receives and assists in confining the bolt, and thus used and operating together the bolt and the ring constitute a new, complete, and efficient scythe-fastener, and superior to any mode of fastening scythes known prior to my invention. Therefore

What I claim as my invention, and desire to secure by Letters Patent, is—

The combination of the loop-bolt and set-ring, constructed and operating substantially in the manner above described and set forth.

PINCKNEY FROST.

Witnesses:
JOHN WARD,
UDNEY BURKE.